April 9, 1929.   G. M. CLASS   1,708,010
TURRET FEED STOP MECHANISM
Filed Sept. 30, 1927   3 Sheets-Sheet 1
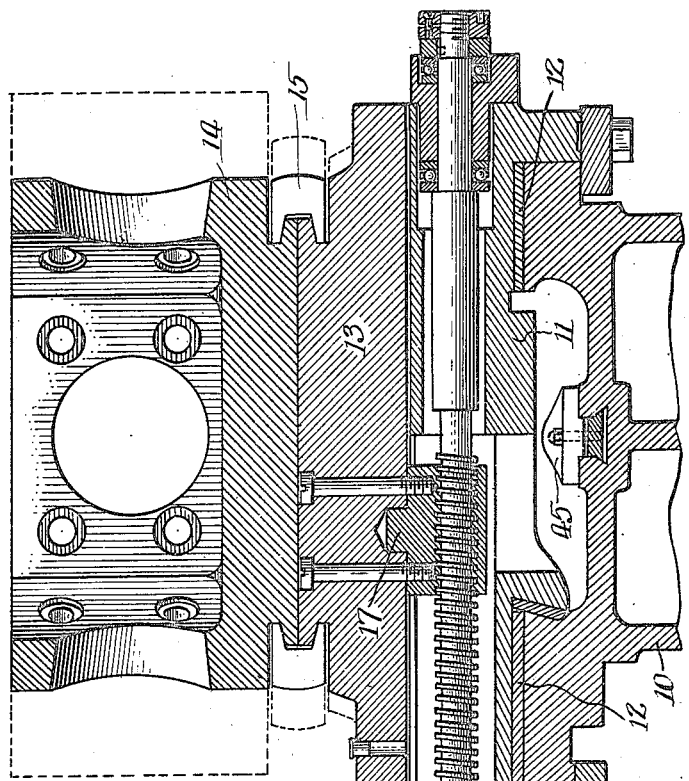
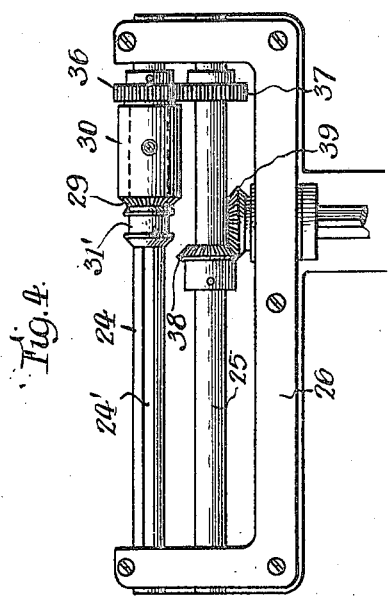
Inventor:
George M. Class,
By Fisher, Towle, Clapp & Soans, Attys.

April 9, 1929.  G. M. CLASS  1,708,010
TURRET FEED STOP MECHANISM
Filed Sept. 30, 1927  3 Sheets-Sheet 2
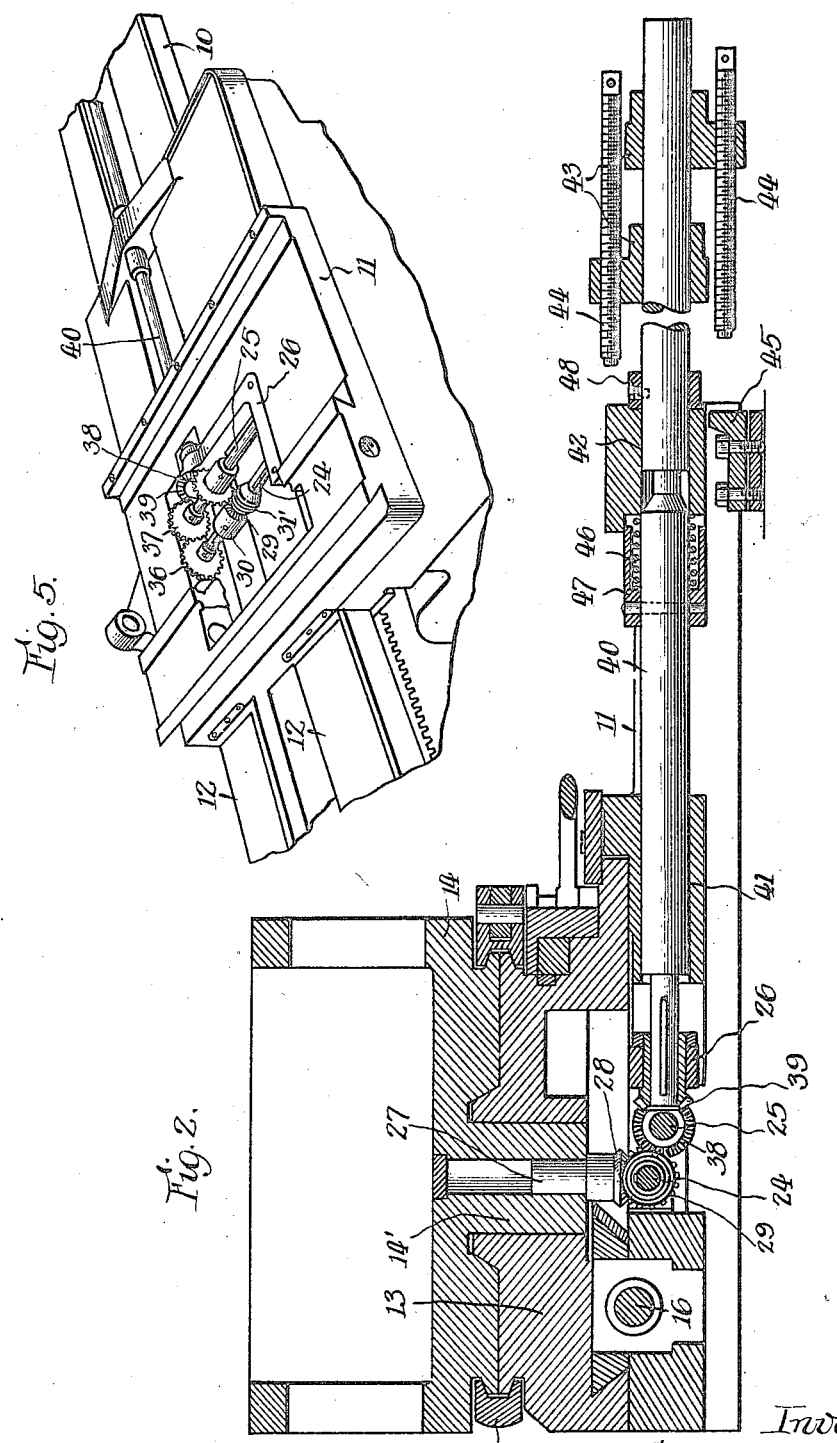

April 9, 1929.  G. M. CLASS  1,708,010
TURRET FEED STOP MECHANISM
Filed Sept. 30, 1927  3 Sheets-Sheet 3

Inventor:
George M. Class,
By Fisher Towle
Clapp + Soans, Attys.

Patented Apr. 9, 1929.

1,708,010

UNITED STATES PATENT OFFICE.

GEORGE M. CLASS, OF MADISON, WISCONSIN, ASSIGNOR TO GISHOLT MACHINE COMPANY, OF MADISON, WISCONSIN, A CORPORATION OF WISCONSIN.

TURRET-FEED-STOP MECHANISM.

Application filed September 30, 1927. Serial No. 223,165.

This invention relates to turret lathes of the character typically illustrated in Letters Patent to Conradson No. 523,327, July 24, 1894.

Lathes of this type employ a revolvable turret mounted on a longitudinal slide on the lathe bed, and are equipped with a rearwardly extending stop bar shaft journaled in the slide and carrying on its rear end an annular group of stop screws, corresponding in number to the tool faces on the turret, which stop screws, at the end of the predetermined forward or feed movement of the turret, strike a fixed stop on the lathe bed and arrest the forward travel of the turret. The pivot shaft of the turret is geared to the stop bar shaft, so that each time the turret is indexed to bring a new face into working position the stop bar shaft is correspondingly turned to bring a new screw mounted thereon into working relation to an adjustable stop on the lathe bed; and a yielding spring connection is provided between the longitudinal slide and the stop bar shaft, by means of which, when the forward movement of the stop bar shaft is arrested the slide and turret may continue to advance sufficiently to actuate the power throw-off by which the forward feed of the turret is discontinued.

To adopt this stop mechanism to lathes employing a cross feeding turret, it has heretofore been proposed to employ a transmission mechanism between the turret head and the stop bar shaft that would remain continuously in mesh during the crosswise travel of the turret, so as to render the stop mechanism operative in any position of the turret on the longitudinal slide; an example of this being shown in Letters Patent to Hendrickson No. 945,947, January 11, 1910. The present invention relates to this latter type of cross feeding turret lathes, and its main object is to provide a simplified and improved mechanism for maintaining a geared relation between the turret and the stop bar shaft during the transverse travel of the turret.

A simple and practical embodiment of the invention is illustrated in the accompanying drawings, wherein—

Fig. 1 is a vertical transverse section through the upper portion of the bed, the longitudinal slide, the transverse slide and the turret base in the vertical plane of the cross feed screw;

Fig. 2 is a longitudinal section in the vertical plane of the turret axis and the stop bar shaft, showing the latter in elevation;

Fig. 4 is a plan view of two intermediate shafts and their supporting frame, through which the drive to the stop bar shaft is transmitted;

Fig. 5 is a perspective view of the turret apron carriage, with the turret and cross-slide removed, showing the stop shaft operating mechanism that is driven from the pivot shaft of the turret.

Figure 3:
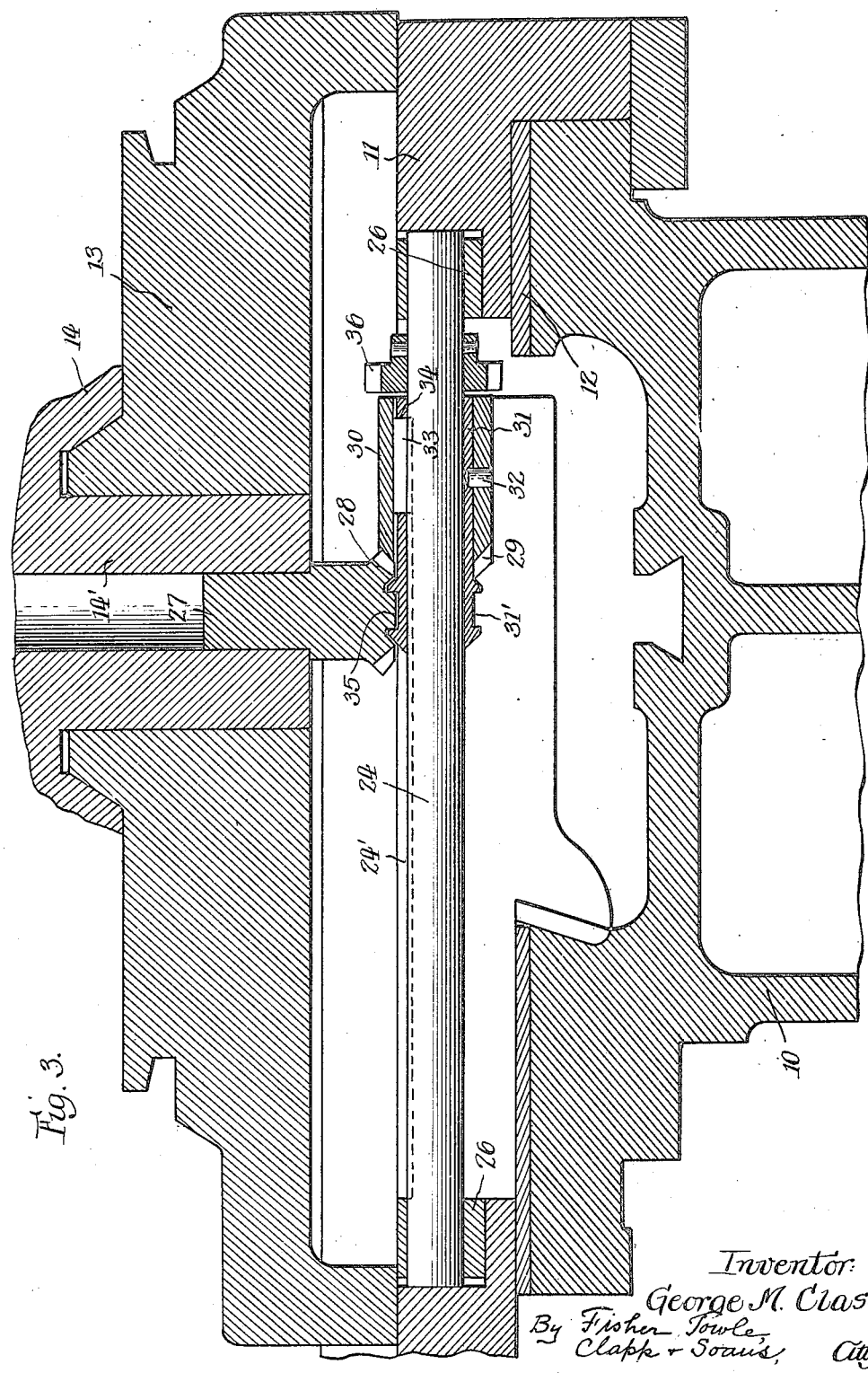
Fig. 3 is a vertical transverse section in the vertical plane of the turret axis showing sliding gear connection between the turret pivot shaft and one of the intermediate shafts from which the drive is transmitted to the stop bar shaft.

Referring to the drawings, and first briefly describing old and known parts of the lathe structure with which the present invention cooperates, 10 designates the bed of the lathe, 11 the main longitudinal slide moving on ways 12 which are hardened and ground steel plates secured to the cast-iron bed. The main slide 11 carries a cross-slide 13 on which is mounted a turret head 14 which is secured to the cross-slide 13 by the clamping ring 15. The turret head may be provided with either or both hand-operated or power-operated indexing mechanism which is not herein shown as the same is well known in the art.

The cross-slide 13 is fed in either direction by the rotation of the cross feed screw 16 the nut 17, which is operated by the feed screw, being secured to the bottom of the cross-slide as shown. The screw 16 can be rotated by hand through hand wheel 18 and sleeve 19 that is splined on the screw by a key 20. On the inner end of sleeve 19 is indicated a pinion 21 driven by a gear 22 in the apron 23 for securing power feed of slide 13.

By reference to Fig. 2 it will be observed that the cross feed screw 16 does not lie directly below the center or axis of the turret head, but is to one side of the center. Directly beneath the center of the turret head is a horizontal shaft 24 and parallel to it another shaft 25, both of which shafts are journaled in a frame piece 26 (Fig. 4) mounted in the main longitudinal slide 11. In the tubular stem 14' of the turret head 14 is secured a stud shaft 27 having on or integral with its lower end a bevel pinion 28 which meshes with a bevel gear 29 on the inner end of a tubular gear shaft 30 that encircles the shaft 24. Figure 3 shows a section of the bevel gears 28 and 29, the latter being splined to the shaft 24 through a sleeve 31 inside the gear shaft 30 and secured to the latter by a screw 32, and a key 33 extending through a slot 34 in the inner sleeve 31 and sliding in a key way 24' in the shaft 24. The inner sleeve 31 is formed with an annular groove 31' that is engaged by a pilot tit 35 on the lower end of the bevel pinion 28, whereby the gear 29, its tubular shaft 30, and the inner sleeve 31 all travel lengthwise of the shaft 24 with the turret head as the latter is fed in either direction by operation of the cross feed screw 16.

Fast on shaft 24 is a spur gear 36 in driving relation to a spur gear 37 (Figs. 4 and 5) fast on the adjacent shaft 25. Also fast on the shaft 25 is a bevel gear 38 in driving engagement with a bevel gear 39 splined on the stop bar shaft 40. Shaft 40 is journaled to turn in bearings 41 and 42 in the rear portion of the longitudinal slide 11, and has mounted on its rear end collars 43 that are tapped to receive and carry the stop bar screws 44, of which latter there are as many as there are faces on the turret head. As the turret head advances, the stop bar shaft 40 and the stop bar assembly carried thereby of course travel with it, and at the conclusion of the predetermined feed of the turret the lowermost screw 44 strikes an adjustable stop or abutment bar 45 that is secured on the bed 10, thus arresting further travel of the shaft 40. A compression spring 46 confined between the rear bearing 42 and an abutment member 47 pinned to the shaft 40 permits a slight further advance movement of the turret after the advance travel of the stop bar shaft 40 has been arrested to permit the operation of a feed throw-out mechanism not herein shown but fully disclosed in the Conradson patent hereinabove identified. The sliding engagement of the gear 39 with the shaft 40 permits the gears 38 and 39 to remain in mesh during this slight further travel of the main longitudinal slide after the forward travel of the stop bar shaft has been arrested. After the feed has been thrown out, the reaction of the spring 46 returns the slide to normal position with relation to the shaft 40, as the turret backs away from the work; the reaction of spring 46 being limited in extent by a collar 48 keyed on the shaft 40 and abutting against the other side of the bearing 42.

I claim—

1. In a turret lathe, the combination of a lathe bed, a longitudinal slide thereon, a cross-slide on said longitudinal slide, a turret head revolvably mounted on said cross-slide, a stop bar shaft journaled in said longitudinal slide, a pair of parallel transmission shafts journaled in said longitudinal slide below said turret head and crosswise of the lathe bed, a sliding bevel gear splined on one of said transmission shafts, said gear having an annularly grooved extension, a bevel gear fast on and coaxial with said turret head meshing with said sliding gear and formed with a pilot tit on its lower side engaged with the annular groove of said extension, a driving connection between said transmission shafts, and a driving connection between the other of said transmission shafts and said stop bar shaft.

2. In a turret lathe, the combination of a lathe bed, a longitudinal slide thereon, a cross-slide on said longitudinal slide, a turret head having a tubular stem journaled in said cross-slide, a stop bar shaft journaled in said longitudinal slide, a pair of parallel transmission shafts journaled in said longitudinal slide below said turret head and crosswise of the lathe bed, a sliding bevel gear splined on one of said transmission shafts, said gear having an annularly grooved extension, a stub shaft secured in and depending from the tubular stem of said turret head, a bevel gear on the lower end of said stub shaft meshing with said sliding gear and formed with a pilot tit on its lower side engaged with the annular groove of said extension, a driving connection between said transmission shafts, and a driving connection between the other of said transmission shafts and said stop bar shaft.

3. In a turret lathe, the combination of a lathe bed, a longitudinal slide thereon, a cross-slide on said longitudinal slide, a turret head having a tubular stem journaled in said cross-slide, a stop bar shaft journaled in said longitudinal slide longitudinally of the lathe bed, a U-frame mounted in said longitudinal slide, a pair of parallel transmission shafts journaled in and extending between the opposite sides of said U-frame and disposed crosswise of the lathe bed, a sliding bevel gear splined on one of said transmission shafts, said gear having an annularly grooved extension, a stub shaft secured in and depending from the tubular stem of said turret head, a bevel gear on the lower end of said stub shaft meshing with said sliding gear and formed with a pilot tit on its lower side engaged with the annular groove of said extension, spur gears on and drivingly connecting said transmission shafts, and bevel gears on and drivingly connecting the other of said transmission shafts and said stop bar shaft.

GEORGE M. CLASS.